United States Patent
Back

[15] 3,667,289
[45] June 6, 1972

[54] APPARATUS FOR TESTING AUTOMOBILES

[72] Inventor: Anders Yngve Back, Johanneshov, Sweden
[73] Assignee: Aktiebolaget Scania-Vabis, Sodertalje, Sweden
[22] Filed: Jan. 5, 1970
[21] Appl. No.: 1,070

[52] U.S. Cl. ..................................73/117.3, 324/15, 346/3
[51] Int. Cl. ..........................................G01m 15/00
[58] Field of Search ...............73/116, 117.2, 117.3, 118, 73/117; 346/3; 324/15, 16

[56] References Cited

UNITED STATES PATENTS

| | | | |
|---|---|---|---|
| 2,736,192 | 2/1956 | Ryerson et al. | 73/117.2 X |
| 3,082,374 | 3/1963 | Buuck | 73/116 UX |
| 3,439,534 | 4/1969 | Pilgrim | 73/117 |
| 3,421,367 | 1/1969 | Mears et al. | 73/116 |

Primary Examiner—Jerry W. Myracle
Attorney—Cushman, Darby & Cushman

[57] ABSTRACT

A measuring and recording apparatus for testing of motor cars in accordance with a predetermined test program including a program unit having a plurality of measuring data inputs connected to different measuring points of a motor car, particularly points of the motor and electrical system thereof. Said inputs are successively switched through to the measuring system of a recording instrument, the successive switching actions being timed in synchronism with the rotation of the motor when disabled and rotated by the starter. During one revolution of the motor, the relative compressions of the cylinders are recorded by recording the starter current, during another revolution, the primary current of the ignition system is recorded, and further single or double measurements may be carried out during any subsequent revolution. Then, the successive switching actions are timed in dependence on time so that during a fixed period, for example, the motor is blocked and the starter is energized, the starter current being recorded during this measuring period. In this way, a test operation results in a series of successive records of magnitudes, essential for the performance of the motor car, are obtained.

13 Claims, 4 Drawing Figures

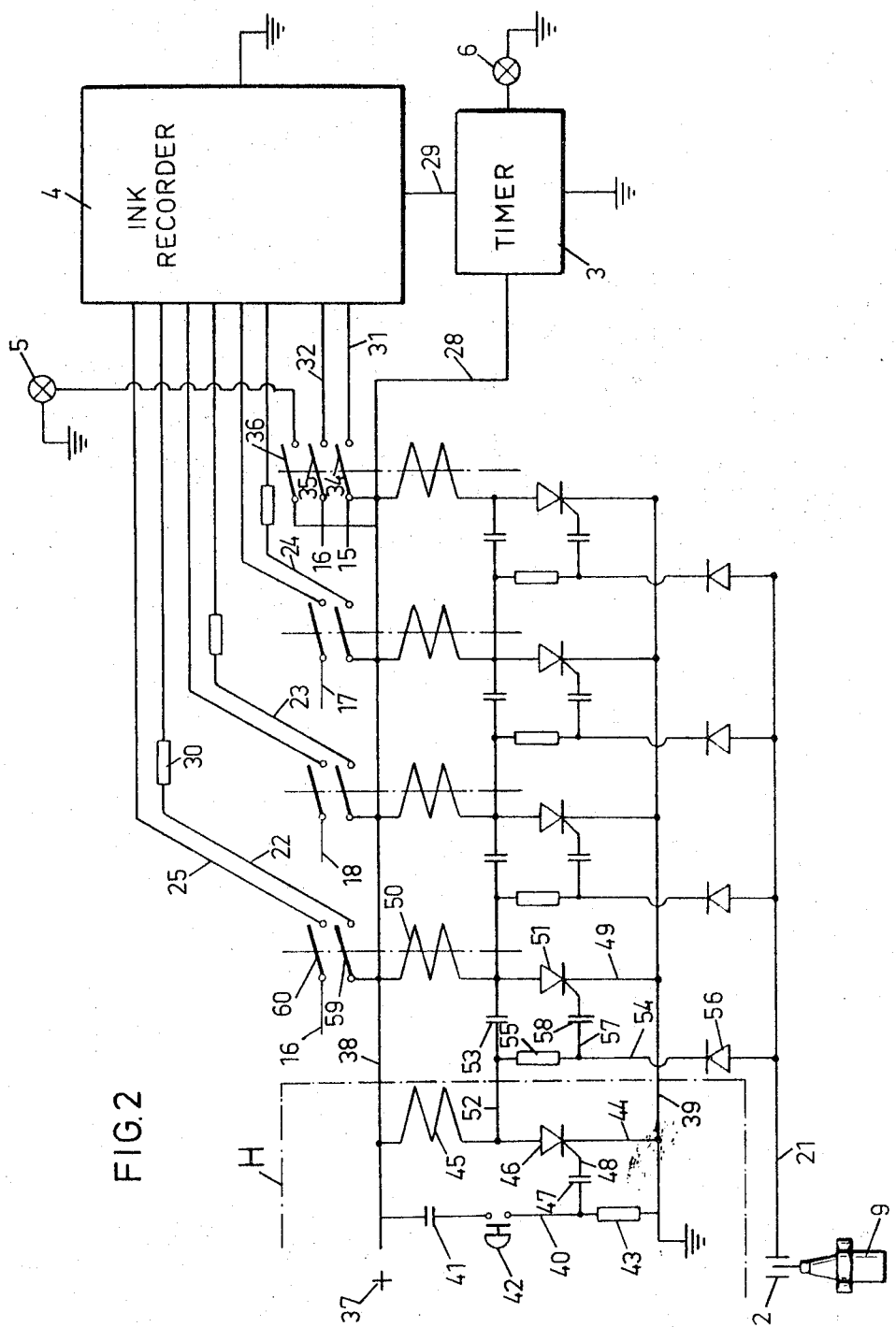

APPARATUS FOR TESTING AUTOMOBILES

In servicing, fault detection and other checks on automobiles it is known to test individually given points, structural components and operations in the automobiles by means of recording or other indicating electric measuring appliances. In this connection there are used either individual measuring devices, specially adjusted in each case for one purpose and independent of one another, or specific combined testing appliances are used for several operations of this type having a common switchboard and indicator panel or the like, or in addition individual instruments and also combined testing appliances are used, since the latter make the testing operation easier and often facilitate it.

In the known combined testing appliances the mechanic or car fitter connects the instruments or measurement leads of the latter to the electric installation of the automobile before the beginning of the first measurement. He then begins with a given measuring sequence of manually switching and adjusting the appropriate instruments of the testing equipment. Usually a reading is taken of the results on indicating or recording measuring instruments or on cathode-ray oscillographs.

Combined measuring appliances do in fact shorten the complete vehicle check, however, they are only rarely used for this purpose, mainly because the mechanic must be specially instructed and skilled in testing techniques and must be capable of accurately evaluating the measurement results and to take them down in a clear and easily understandable manner, and because no complete, objective documentation of the results is obtained. In general there is only the result of the compression measurement as an objective test record. For this purpose the spark plugs must be removed from the engine and replaced by pressure transducers, which after the measurement must be unscrewed again and replaced by the spark plugs. Moreover, in the case of pure fault detection, troublesome measurements are often necessary, since breakdowns often do not admit of any direct inference as to the source of the defect.

The invention makes possible a rapid and simple testing even with less skilled workmen without instruction in measurement techniques and their evaluation with verifiable objective recordings being obtained. It is also possible in accordance with the invention moreover, to measure the compression without unscrewing the spark plugs or carrying out similar steps, by measuring the course of the current of the starter motor circuit of the engine during starting, that is in the case of an engine unable to run by itself, as the starter motor current varies in a manner inversely proportional to the compression pressure of the concerned cylinder or other combustion chamber, so that the current amplitudes associated with the respective cylinders permit a direct comparison of the compression of the cylinders in their firing order.

A test in accordance with the invention on a vehicle can be carried out in two or three minutes, while a similar conventional test requires about 20 minutes.

A specific embodiment of the invention will now be described by way of example with reference to the accompanying drawings, in which:

FIG. 2 is a wiring diagram of a program unit contained in the apparatus; and

Figure 1:
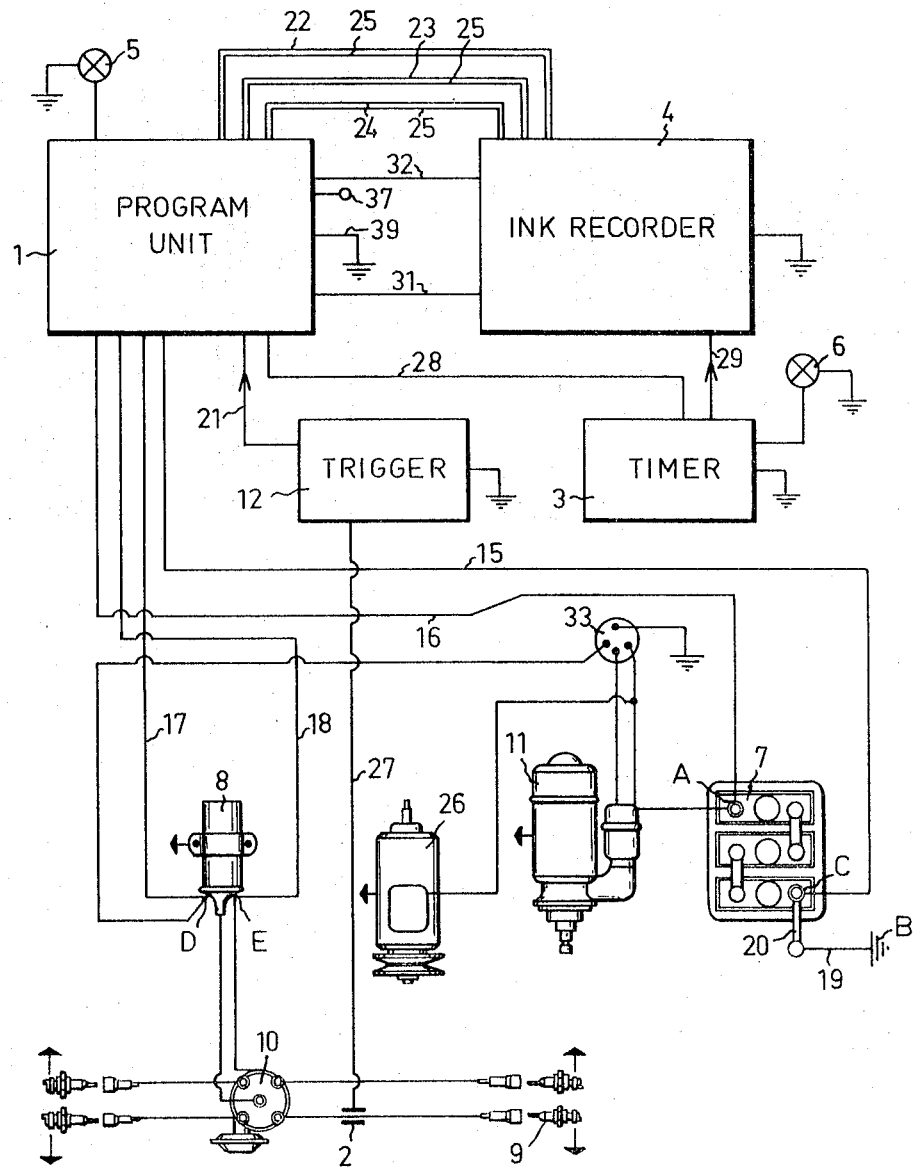
FIG. 1 is a block wiring diagram of an apparatus.
Figure 4:
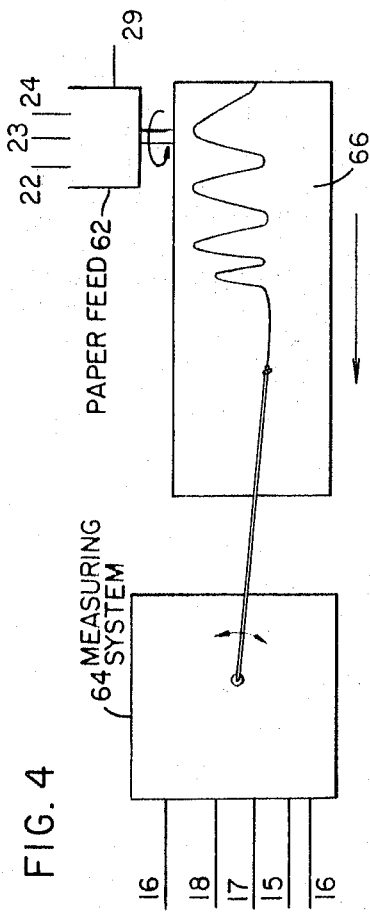
FIG. 4 shows a paper feed type of recording instrument.

The testing device as shown in FIG. 1 essentially comprises a program unit 1, a timing pulse transmitter 2, a monostable trigger 12 (or a multivibrator acting as a pulse shaping circuit or pulse regenerator), a timer or time-switch 3, a recording measuring instrument 4 and two signal or indicating lamps 5 and 6, these elements being interconnected to one another and with the electric installation of the automobile, in the manner shown in FIG. 1. Only those parts and means of the vehicle electrical installation which are of interest for the test equipment, are shown, that is a battery 7, an ignition switch 33, a starter motor 11, a dynamo 26, an ignition coil 8, an ignition distributor 10 and four spark plugs, the spark plugs which fires last in the firing order being designated 9.

Figure 3:
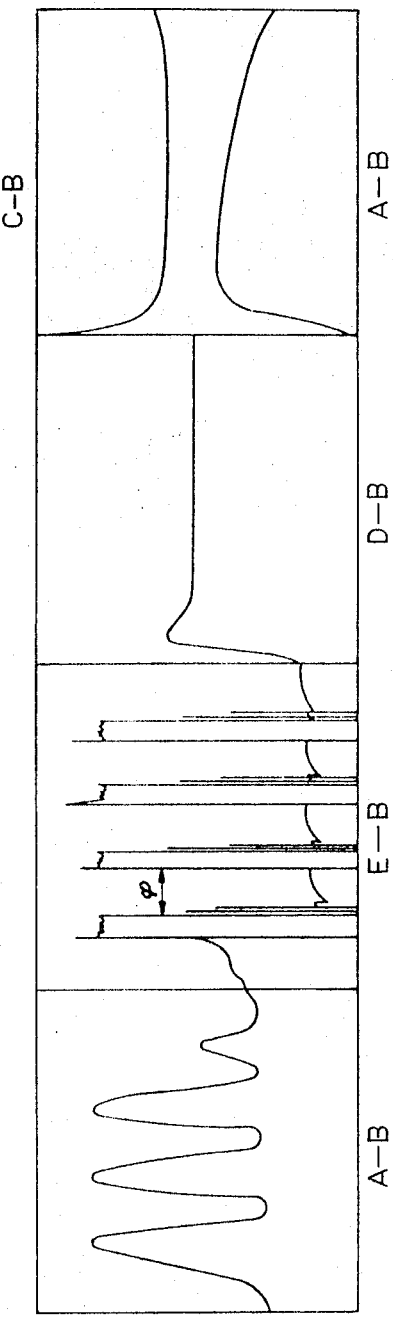
FIG. 3 shows a test diagram automatically recorded with the apparatus.

In the following it is assumed that all the measurements described with reference to FIG. 3 are undertaken when the engine is rotated by means of an external drive, for example by the starter motor, and is kept blocked during the last (fourth) measurement, and thus, when no fuel, or mixture capable of ignition is being fed to the engine. Through this it is achieved inter alia that the engine can be tested, without a long hot running period, directly while cold and independent of the nature and quantity of fuel and air required for combustion, and in this connection there are obtained uniform and easily reproducible test results. At each corresponding input of the program unit 1 there are attached four instrument leads 15 to 18 to be connected to individual measuring points A, C, D and E of the electric system of the automobile, the earth (ground) forming a reference point B in each of the measurements described below and is embodied in the program unit and in the measuring instrument by the earth connection of the same. The four instrument leads 15 to 18 therefore represent the input leads of the program unit. The lead 15 is connected to the negative terminal of the vehicle battery 7, this terminal forming the measuring point C, which is connected to the earthed measurement reference point B via a resistor 20 and an earth lead 19. The resistance value of the resistor is chosen such that the voltage drop across the resistance of the whole lead current of the vehicle battery can by measured in a voltage measurement range favorable for measuring operations, when the usual direct (zero-resistance) earthing of the negative battery terminal is interrupted.

The second instrument lead 16 of the program unit 1 is connected directly to the positive battery terminal and forms the measurement point A. The third instrument lead 17 is connected to the measurement point D being the input terminal D of the primary side of the ignition coil 8. The fourth instrument lead 18 is connected to the output terminal of the primary side of the ignition coil, which forms the measurement point E.

It is noteworthy for the vehicle test described below that no measurement point is needed in the secondary circuit of the ignition coil, that is, in the high tension ignition circuit. Only the timing-pulse transmitter 2 is connected to this high tension circuit, preferably only capacitively to the ignition cable. However, it could be operated just as well by another part of the vehicle drive, for example by the flywheel or the cooling fan drive and can then consist of a mechanically, inductively, capacitively or photo-electrically controlled switch means, for example a photo-transistor or photo-cell controlled by an illuminated chalk line or a shiny or reflective adhesive tape on the flywheel.

The program unit is also provided with a control input, which is connected through a control impulse lead 21 to the output of the trigger 12, which is fed by the timing-impulse transmitter 2 via a lead 27 with timing impulses and converts the latter into similar impulses of the same and suitable amplitude, duration and form. In the present embodiment the impulse transmitter or generator is a capacitive impulse transmitter which, for example, comprises a sufficiently large-area clamp or metal web and is clamped against the ignition cable of the spark plug 9 or is wound around it one or more times.

Before the start of the vehicle test only the following measures are required. If the test apparatus is not provided with a suitable supply battery, and if the positive supply voltage connection shown in FIGS. 1 and 2, is not connected directly with the instrument lead 16, which is in turn connected to the positive terminal of the vehicle battery, the test apparatus should be connected to a separate supply battery, or if built for mains supply, connected to the lighting mains. Furthermore, the test device should be earthed, for example at 39, if it is not permanently earthed or is earthed via a ground wire, if any, in the mains supply line.

The direct earthing of the vehicle battery is then interrupted and its negative terminal is earthed via the resistor 20 and the earth lead 19. The four instrument leads 15 to 18 are connected to their respective measurement points A, C, D, E. The ignition key is then inserted in the ignition switch 33 of the vehicle, turned to the operating position thus connecting in the starter motor, and the test start (push-button) switch 42 of the test device is pressed (mentioned more below).

When the last spark plug 9 in the firing order receives ignition voltage, an impulse is produced in the timing-impulse transmitter 2 and converted by the monostable trigger 12 into a standard tension impulse of 5 volts for example, for which an impulse transformer can if necessary be provided. According to the type of impulse transmitter 2 used, its connection with the ignition cable, and the type of construction of the control device of the program unit, the trigger 12 can be dispensable and the impulses from the impulse transmitter 2 can directly control the program unit, that is to say synchronize it with the vehicle engine. The program unit controlled in this way determines the start of at the least the majority of the individual measurement operations of the test and the end of several, but not of all of these measuring operations.

FIG. 2 shows as an example the wiring diagram of a suitable program unit 1, which like the time switch is fed by a direct-current source 37, 39 or by the vehicle battery. The negative supply lead 39 and the negative supply voltage terminal are earthed.

The program unit includes a manual control stage H for switching on the test device and the complete test operation. This stage includes a lead 40, with which a capacitor 41, a press button switch 42 and a resistor 43 are connected in series with each other between the supply leads 38 and 39 of the program unit. Moreover this stage includes between the supply leads 38 and 39 in series with one another in a lead 44 a resistance coil 45 and a thyristor 46, whose control electrode 48 is connected via a further capacitor 47 to the non-earthed end of the already mentioned resistor 43.

In addition the program unit also comprises four at least approximately similar switching stages for operation of successive measurements, of which only one will therefore be described in detail in the following. Each of these stages includes a lead 49, with which the winding 50 of a reed relay is connected in series with a thyristor 51 between the two supply leads 38 and 39. In addition a lead 54 goes from the impulse transmitter lead 21 via a blocking diode 56 and a resistor 55 on the one hand via a lead 52 to the negative end of the winding 50 of the preceding switching stages, or in the case of the first switching stage to the negative end of the coil 45, and on the other hand via a disconnecting capacitor 53 to the negative end of the individual winding 50. The control electrode of the thyristor 51 is connected via a capacitor 58 and lead 57 to the junction of the resistor 55 and diode 56.

The reed relay of each switching stage operates as usual in such a way that on the energization of its winding 50 the armature moves and in the present case closes several pairs of normally open or make contacts. In the first three measurements switching stages the relay closes two pairs of normally open contacts 59 and 60, the connection of each of three pairs of contacts (switches) 59 being connected with the positive supply lead 38. One end of three other switches 60 are connected with each one of the instrument leads 16 to 18 of the program unit 1 and therefore with each one of the measurement points A, C and D. On closing the relay switches 59, 60 for example of the first switching stage, there is fed to the recording instrument 4 via the leads 22, 23, 24 connected to the switch 59 and a series resistor 30, an electric signal determining the recording speed, for example a paper feed speed, of the measuring instrument 4, the speed for each individual measuring operation being capable of adjustment by altering the associated series resistor 30. On closing the other switch 60 measurement signals, for instance in the form of measurement impulses are fed to the instrument 4. In the fourth measurement switching stage the reed relay possesses three normally open switches 34 to 36, two of which, viz. 34 and 35, being each connected to an instrument lead 15 and 16, respectively, and the third switch 36 is connected to the positive supply voltage lead 38, and on the other hand lead to inputs 31 or 32 and via the indicator light 5, to the negative supply voltage lead, that is to earth. Consequently, this fourth switching stage does not influence the recording speed (paper feed) of the measuring instrument 4, but the speed and measurement period are controlled by the timer 3, which for this purpose is connected via a lead 29 to the instrument 4. The timer 3 is fed via a lead 28 and earth with the same supply voltage as the program unit 1 and comprises time-determining means, which switch-on the recording instrument 4 via the lead, and control the paper feed thereof, or alternatively the recording speed. The time-determining means of the timer 3 essentially comprise transistor time bases or triggers of such a number and nature that they determine in the second test cycle the times necessary for the measurements. The construction and mode of operation of such a timer can be assumed to be known or obvious.

The recording instrument 4 can be any suitable recording measuring instrument. In the case of high accuracy requirements, a recording vibrator or bifilar oscillograph can be advantageously used. The frequency range needed for the measurements of the kind intended here, is, however, sufficiently restricted for the use of ordinary ink or pen recorders or similar recording instruments, whereby the costs are lower and employment simpler. In addition it is also possible to use for example tape recorders for magnetic recording for subsequent semi-automatic or automatic evaluation of the measurements. On using suitable supplementary units known per se, such as code input circuits, it could also be possible to use inter alia a punched tape recorder.

If a paper feed signal is fed to the recording instrument via one of the leads 22 to 24 or 29, the paper feed 62 begins at the speed determined by the signal to feed paper 66 and at the same time a measurement signal 15 through 18 is fed to the measuring system 64 of the recording instrument via the appropriate instrument lead 25. By the last measurement switching stages of the program unit, it is also possible to control a double measuring system for two simultaneous independent recordings via each one of the instrument leads 31, 32, that is two different measuring operations can be recorded at the same time. Similarly it is also possible to record more than two operations at the same time, preferably by making the instrument 4 as a multi-color ink recorder and/or a chopper bar recorder.

Where mention is made of feed movement of the recording medium, which is usually a paper tape or a paper sheet, is mentioned, this is to be understood to be a relative movement. With certain instruments for example with many types of level and coordinate (XY) recorders, the recording medium is stationary, while the recording element (pen, stylus or ink jet nozzle, light beam or the like) is movable both in the feed direction and in the deflection direction. The only important thing is a continuous recording of a magnitude measurement in dependence on time, on the rotation of the main shaft or on other dimensions.

The test apparatus is therefore of such a type that several measurements are automatically carried out in succession and preferably recorded on one and the same recording medium. Each one of these measurement cycles following one another in time can, however, be composed of several, simultaneous measuring operations and recordings independent of one another, which here is only illustrated for the last measurement switching stage with the two instrument leads 15 and 16 on the measurement inputs 31 or 32 of the instrument.

For a better explanation of the operation of the program unit 1 and its adaptability to various measuring operations, there is shown in FIG. 3 by way of example the recording of a complete measurement program. The total recording contains four measurements occuring in series in time from left to right, the last two of which comprise two simultaneous different measurement operations. The feed speed of the recording medium (paper tape) during each of the four measurements is so chosen that the record area is approximately square in each case.

When the test equipment is connected to the measurement points A to D according to FIG. 1 and to the possibly exterior supply current source (37 and earth), before pressing the switch 42 all the circuits of program unit 1 are dead, since inter alia the thyristors 46, 51 are non-conductive. If now the switch 42 is pressed, then a current surge flows across the capacitor 41 and the resistor 43, and the voltage then occuring across the resistor 43 passes via the capacitor 47 to the control electrode 48 of the thyristor 46 of the manual control stage H, whereby this thyristor becomes and remains conducting. If then the ignition voltage of the spark plug 9 and the impulse transmitter 2 produce the first pulse, this pulse enters via the lead 21 and the blocking diodes 56, the measurements switching stage of the program unit connected via the instrument lead 16 to the measurement point A (positive terminal of the vehicle battery) is therefore conducting. Its structural elements are so dimensioned in relation to one another that the pulse causes a reversal of polarity at the thyristor 46 of the control stage H, and it thus blocks the latter and simultaneously renders the thyristor 51 of the first switching stage conducting. The reed relay 50 of this stage is therefore energized and closes its contacts 59 and 60 so that the paper feed of the recorder 4 is switched on and the voltage between the measurement points A and B is measured and recorded, that is to say by measuring the e.m.f. of the battery minus the voltage drop across the battery and the artificial earthing resistance 20.

This voltage A-B alters in reverse proportion to the compression pressure of each cylinder, which has just been compressed, so that the curve obtained in the excited first switching stage of the program unit 1, corresponds to the compression operation of the cylinder in ignition firing order. If it is assumed that the engine has four cylinders and that the compression of the last cylinder in the firing order (which comprises the spark plug 9) is imperfect, there is obtained the recording A-B on the far left in FIG. 3. From this curve it may be clearly seen that the voltage peak (i.e., the starter motor current peak) for the first three cylinders is equally high, but is considerably lower for the fourth cylinder. This recording A-B has in fact actually been obtained with a four-cylinder engine, in which the compression of the fourth cylinder was reduced intentionally to about 60 percent of the normal value. In FIG. 3 the voltage curve is reversed and it can easily be seen that the voltage measured and recorded from the fourth cylinder and considered with respect to the zero base, actually amounts to 60 percent of that in the three other cylinders, therefore the compression is proportional, from which one can see the reliability of the measuring process.

Hitherto only the thyristor 51 of the first measurement switching stage of the program unit is conducting.

The next impulse from the spark plug 9, during the second engine revolution, causes the second switching stage to be supplied with current and the thyristor 51 of the first switching stage therefore is cut-off.

Now only the second stage is conducting and energizes its reed relay, so that the instrument 4 records the voltage between the points E and B, that is the voltage at the output terminal of the primary side of the ignition coil 8. In this way there is obtained values for estimating the contact closure angle of the ignition distributor 10 and so on.

The second recording from the left in FIG. 3 comprises a primary voltage curve E-B, which is already known by measurements with cathoderay-oscillographs and, in the case of automobiles with asymmetrical distributor cams, is of particularly great importance.

Not only the said contact closure angle $\phi$ but also many other important relationships of the ignition circuit can be understood from the curve. If, for example, the four ignition peaks or "spikes" of the curve are not equally high, this means that the individual ignition circuits of the four cylinders are unequally loaded, for example the ignition gap (electrode gap) of one or more spark plugs being too wide. It is also possible to recognize from the curve any possible capacitor defect or ignition coil defect. It is also possible to determine the instant of closure of the contact breaker.

If the third impulse of the impulse transmitter 2 reaches the input 21 of the program unit 1 by way of the trigger 12, then the thyristor of the second measurement circuit stage becomes non-conducting and that of the third circuit stage conducting, whereby this operation proceeds in the same way as above in the second stage. The third stage is connected by way of the measuring lead 17 to the measuring point D and serves for the measurement of the voltage at the input terminal of the primary winding of the ignition coil 8 in relation to ground (earth) B, that is to say, the voltage between D and B is measured, see the third record D-B on FIG. 3, the smoothness of the curve being owed to a usual spark suppression capacitor (not shown) connected between point E and ground. Deviations of this curve from its normal course may be attributable to loss of voltage in the ignition switch, to oxidized fuzes, plug-in connections, cable connections, earthings, etc. The latter faults are also recognizable from other curves of the complete measurement. A skilled judge of measurement-curves is thus usually in a position to ascertain where faults of this kind occur in the vehicle being tested.

The fact that the curves of the first three records of FIG. 3 run straight into each other is due solely to the fact that the switching-over of the measurement circuit stages occurs essentially faster than the response of the recording mechanism of the measuring instrument.

The last measurement circuit stage in FIG. 2 is in the same way switched on by the fourth impulse at the input. At the same time the indicator lamp 5 lights up to signify that the first cycle of the measurement is complete and that therefore the ignition key should be turned back in its ignition switch 33 to its "Off" position. If this is inadvertently omitted, then nevertheless there will be no further recording as the paper feed of the recording mechanism 4 is no longer operative.

Then the second cycle of measurement begins.

Whereas in the first measurement cycle the testing procedure went on and was ended synchronously with the engine of the vehicle, the duration of the measurement process pertaining to the second measurement cycle is determined by the timer 3, in which indeed the ending of such measurement processes does not have to occur unconditionally at a definite point in time or after a definite period but can be fixed by a dimension other than time, for example, if in the test described below as to the load on the battery, the battery voltage reaches a predetermined lower limit.

In the example described here, there is provided for this second measurement cycle in the program unit 1 only one measurement switching stage to start two measuring operations running simultaneously. The second measurement cycle can, however, comprise several successive measurements, each with one or more simultaneous measuring operations, whereby in the present example the program unit should be provided with as many extra measurement switching stages as the number of additional measurements in the series, the duration or termination of which is then in each case controlled by the timer 3. The switching-on of the timer itself in operation is advantageously brought about automatically in dependence upon a quantity, see the following example.

The second measurement cycle here relates to the testing of the state of charge of the vehicle battery 7. When the indicator light 5 has indicated the end of the first measurement cycle, the vehicle top gear is engaged, the handbrake applied, and the ignition key turned to the "On" position again. As the engine is now held in check, the starter 11 is also blocked, on account of which a voltage drop occurs in the vehicle battery 7 itself. This engages the timer 3, which activates its timing circuits consisting of transistor-triggers and operates the paper driving means of the instrument 4. This driving mechanism is dependent upon the period of function set in the timer 3. The fourth measurement switching stage relating to the second measurement cycle remains from now on conducting and the measuring points A and C connected to its relay contacts 34, 35, 36 (currents A–B or C–B in the diagram of FIG. 3) thus effect the simultaneous indication of the voltage and current of the loaded battery 7, as a function of time, these two test values being transmitted to the instrument 4 by way of the leads 31 and 32. After this battery test during the time period predetermined by the timer 3 is expired, the transistor stages of the timer switch the instrument 4 off and switch on the indicator light 6, whose illumination signifies that the complete measurement has ended. Finally, the ignition key is turned back into the "Off" position again.

The embodiment described above relates to four important testing operations in the testing of an automobile, in which the last testing operation comprises two simultaneous measurements for testing the battery. A testing apparatus in accordance with the invention may, of course, also be arranged for more than four successive testing operations, in which each of such testing operations may in itself comprise two or more simultaneous measurements. For example, the program unit described above can for this purpose contain any number of measurement switching stages, perhaps some in reserve, and as is shown in the described example a stage of this kind can very easily be produced for two or more simultaneous measurements. In the embodiment shown, only those measurements were considered in which the quantity to be measured is present already as an electrical signal or is represented by an electrical signal which is in itself already present. Of course, with the testing apparatus, non-electrical quantities can also be recorded if they are transformed into electrical quantities. In itself, the recording measuring instrument could also wholly or partly contain non-electric, for example hydraulic measuring systems, in which the program control unit, where it is of purely electrical control, could control hydraulic solenoid valves. Since possibilities of this type are at present of no particular significance in practice, they are here mentioned only incidentally.

Among other test-values which may be of interest in testing a vehicle, may be mentioned: pressures, power, acceleration (also negatively, as retardation or braking), noise level, carbon monoxide content of exhaust, lack of balance, etc.

Especially in moderate and small works with limited possibilities of being able to provide separate instruments for different purposes and of maintaining trained operatives, a testing apparatus in accordance with the invention is of economic and practical importance, all the more so as it provides an objective document in the form of automatically recorded test-values on one and the same recording medium, by which not only are errors and sources of possible confusion largely removed, but which also can be delivered to the customer as an authentic document as to the test undertaken as such and also as to the condition of the vehicle. This is also of psychological importance, since the customer not uncommonly suspects that a test was carried out unreliably or not at all, or that repair work which was accounted for was perhaps unnecessary, or not carried out. With the test apparatus in accordance with the invention, the vehicle owner can in practice be given an immediate record of the condition of the vehicle before he makes a request for some kind of work to be carried out on it, and with further testing after the repair of the vehicle he can again easily be given evidence of the condition of the vehicle thus attained. There is thus an objective proof of possible faults in the delivered vehicle and of the removal of these, in each case so long as it is a question of faults which are recognizable at reasonable expense with a test apparatus of this kind. More serious faults of a different kind, in particular purely mechanical faults, rust damage, damage to paintwork etc., are, however, usually so easy to recognize subjectively and are so evident at least with the aid of exchanged, demounted parts that the aspect of objectively establishing faults and their elimination then diminishes in importance.

It may finally be mentioned that a test apparatus in accordance with the invention can also be used as the central instrument for several testing positions, also for comparison tests. In addition, the test apparatus could even be used for the simultaneous recording of diagrams similar to FIG. 3 at several test positions, if the measuring instrument 4 were correspondingly to contain four simultaneously operating recording measuring systems and were for example a sixfold or twelvefold recorder, and if the measuring circuit stages of the program unit were correspondingly to have four circuit contacts. Also the testing apparatus is versatile in so far as it can be used, if required, with two or more separate recording measuring instruments; this could be achieved in the above-given embodiment in that, for example, the lead 31 is connected to a different measuring instrument from the leads 25 and 32. Consideration must then, indeed, be taken of the disadvantage of separate recordings for one and the same vehicle, for example, the danger of confusion and error, which also may come into question even if it is unavoidable that it would be difficult to distinguish between two curves appearing in the same measuring zone of the recording medium.

What I claim is:

1. An apparatus for testing a vehicle having an engine by measuring and recording various quantities relating thereto comprising plural electrical leads each being connected at one end to a separate measuring point or pick-up attached thereto of the vehicle, a permanently recording measuring unit, a switching means disposed between the other ends of said electrical leads and said measuring unit and in electrical connection thereto for connecting said leads, to said measuring unit and means responsive to the angle of rotation of the main shaft of the engine for actuating said switching means to sequentially connect at least some of said leads.

2. Apparatus as recited in claim 1 further including a timing circuit activated by said switching means for supplying a control signal to actuate said switching means independently of said means responsive to the angle of rotation of the main shaft.

3. Apparatus as recited in claim 2 wherein said switching means responsive to said timing circuit further includes means for connecting more than one of said leads to said measuring unit at one time.

4. The apparatus as recited in claim 1 wherein said measuring unit includes means for producing upon a single piece of material a permanent record of the data transmitted thereto by said electrical leads.

5. Apparatus as recited in claim 4 wherein said means for producing a permanent record comprises a measuring system for producing a permanent output responsive to the input to said measuring system, a web of paper, means for enscribing said permanent output on said paper and a paper feed means for moving said web of paper transversely past said enscribing means.

6. Apparatus as recited in claim 5 further including means for controlling the speed of said feed means.

7. Apparatus as recited in claim 6 wherein said paper feed means is electrically powered and said feed speed control means comprises plural leads from a source of electrical power which are connected to said measuring unit by said switching unit simultaneously with said measuring leads and a variable resistor is provided on at least one of said plural power leads for controlling the current supplied to said paper feed means.

8. The apparatus as recited in claim 5 wherein said means responsive to main shaft rotation produces an electrical pulse which activates each succeeding switching stage and is passed through said de-activating means to de-activate the next preceeding switching stage.

9. Apparatus as recited in claim 1 wherein said switching means comprises a plurality of switching stages for connecting individual leads to said measuring unit when said stages are sequentially activated by said means responsive to main shaft rotation and means inter-connected between said stages are provided for de-activating the next preceeding switching stage when each succeeding switching stage is energized.

10. The apparatus as recited in claim 9 further including an impulse shaping circuit connected between said means responsive to main shaft rotation and said switching stages for converting said pulses into standard pulses of approximately identical form, duration and amplitude before they are fed to said stages.

11. Apparatus as recited in claim 1 wherein said engine is of the spark ignition type and said means responsive to main shaft rotation comprises a capacitive impulse transmitter, at least one square centimeter in area, which is applied around a spark plug cable of the engine spark ignition which transmitter produces a pulse by capacitive action with said cable when a pulse passes through said spark plug cable in response to the rotation of the distribution rotor of which, in turn, rotates in proportion to the shaft rotation of the main engine shaft.

12. Apparatus for testing the relative cylinder compression of an internal combustion engine having plural cylinders, an electrical starter motor and a battery which supplies electrical power to said starter motor which apparatus comprises means for measuring the starter motor current required to completely rotate the main shaft of said engine by said starter motor and thus cause a sequential compression in each cylinder, said means including an electrical lead connected to the output terminal of said battery, and containing a series resistor, a recording unit responsive to electrical signals for producing a permanent record of electrical signal amplitude, a switching means which is adapted to connect said electrical lead and resistor to said recording unit so that said recording unit measures the voltage drop across said battery and resistor when said switching means is activated and means responsive to the rotation of the main shaft for activating said switching means.

13. Apparatus as recited in claim 12 wherein said means responsive to main shaft rotation comprises a capacitive impulse transmitter at least one square centimeter in an area which is applied around a spark plug cable of the engine which transmitter produces a pulse by capacitive action with said cable when a pulse passes through said spark plug cable in response to the rotation of the distribution rotor of the ignition circuit which, in turn, rotates in proportion to the shaft rotation of the main engine shaft.

* * * * *